United States Patent [19]

Ohmura

[11] Patent Number: 4,589,748
[45] Date of Patent: May 20, 1986

[54] EXPOSURE CONTROL DEVICE FOR CAMERA

[75] Inventor: Hiroshi Ohmura, Tokyo, Japan

[73] Assignee: Fuji Photo Film Co., Ltd., Kanagawa, Japan

[21] Appl. No.: 748,698

[22] Filed: Jun. 25, 1985

Related U.S. Application Data

[62] Division of Ser. No. 595,543, Mar. 27, 1984.

[30] Foreign Application Priority Data

Mar. 31, 1983 [JP] Japan .................................. 58-45832

[51] Int. Cl.[4] .......................... G03B 3/00; G03B 9/10; G03B 9/58
[52] U.S. Cl. .............................. 354/195.12; 354/236; 354/250; 354/256
[58] Field of Search ............... 354/118, 226, 236, 250, 354/252, 256, 195.12

[56] References Cited

U.S. PATENT DOCUMENTS

| | | | |
|---|---|---|---|
| 3,405,624 | 10/1968 | Peterson | 354/250 |
| 3,443,499 | 5/1969 | Gianino | 354/226 |
| 3,774,512 | 11/1973 | Seiden et al. | 354/118 |
| 3,796,485 | 3/1974 | Seiden | 354/118 X |
| 4,140,381 | 2/1979 | Douglas | 354/250 X |

Primary Examiner—William B. Perkey
Attorney, Agent, or Firm—Young & Thompson

[57] ABSTRACT

An exposure control device for use with a camera provided with two objective lenses having different focal length which are selectively used includes two exposure control elements which are disposed in front of and facing to the two objective lenses, respectively, and simultaneously driven by a drive means. One of the lights passed through the respective exposure control elements which is selected by optical path changing means is allowed to reach a film. The exposure control elements are used either diaphragms which usually allow the admittance of light into the objective lenses or shutters which are usually forced to be in positions where intercepting the optical paths of the objective lenses.

6 Claims, 7 Drawing Figures

EXPOSURE CONTROL DEVICE FOR CAMERA

This application is a division of application Ser. No. 595,543, filed Mar. 27, 1984.

BACKGROUND OF THE INVENTION

The present invention relates to an exposure control device functioning as a diaphragm and/or shutter which is utilized in a camera with lenses having different focal lengths.

There has been known widely a camera provided with a long focus lens (hereinafter referred to as a "telephoto lens") and a short focus lens (hereinafter referred to as a "wide angle lens") which are arranged side by side and either one of which is selectively used for telephotography or wide angle photography photographing. An exposure control device for use with such camera is often installed in a space between an objective lens and a film plane as is disclosed in, for example, Japanese Pat. unexamined publication No. 128930/'81. The exposure control device thus arranged which may be in the form of a shutter can be available in common for telephotography and wide angle photographing. On the other hand, a large space is disadvantageously necessary to install a drive unit of the exposure control device or shutter around an exposure frame. A general tendency in designing miniature cameras, is to dispose components of a camera in a space between the lens and an exposure aperture frame close to the very limit of the field of the lens, for compactness of the camera. But this makes it impossible to dispose a shutter or other components in the space between an objective lens and an exposure frame.

When it is difficult to dispose a shutter in such a space, it is necessary to provide the camera with two shutters independently operable in front of the two lenses. The arrangement of the independently operable shutters requires two drive means for the shutters and a change means which can serve to inhibit a drive means, i.e., a shutter and allow the other when the other one is used. The construction of such conventional cameras disadvantageously requires an increasing number of components and makes cameras inconvenient to operate.

OBJECTS OF THE INVENTION

It is therefore a primary object of the present invention to provide an exposure control device suitably incorporated in a camera provided with interchangeable lenses in which there is not sufficient space to dispose it between an objective lens and an exposure frame.

It is another object of the present invention to provide an exposure control device which is simple in construction and comprises a small number of component parts owing to a common drive means for two exposure control elements thereof.

It is still another object of the present invention to provide an exposure control device which makes it unnecessary to drive selectively two exposure control elements thereof.

It is a further object of the present invention to provide an exposure control device which is produced at a low cost.

SUMMARY OF THE INVENTION

For accomplishing these objects of the present invention, there is provided an exposure control device which includes two exposure control elements, respectively arranged in front of two objective lenses, for example a wide angle and a telephoto lens. Such a front arrangement of an exposure control device can make it possible to arrange the exposure control elements thereof in the same plane and also makes it easy to be incorporated in a camera which has no space for installing the exposure control device between the objective lenses and an exposure frame. A drive means is provided for operating both of the two exposure control elements. In comparison with an exposure control device of the type having two exposure control elements one of which is directly driven by a drive means and the other is caused to operate as a result of the drive of the one, the exposure control device according to the present invention can comprise a smaller number of component parts and furthermore, requires no operation which renders the exposure control elements selectively operable.

DETAILED DESCRIPTION OF THE INVENTION

Figure 1:
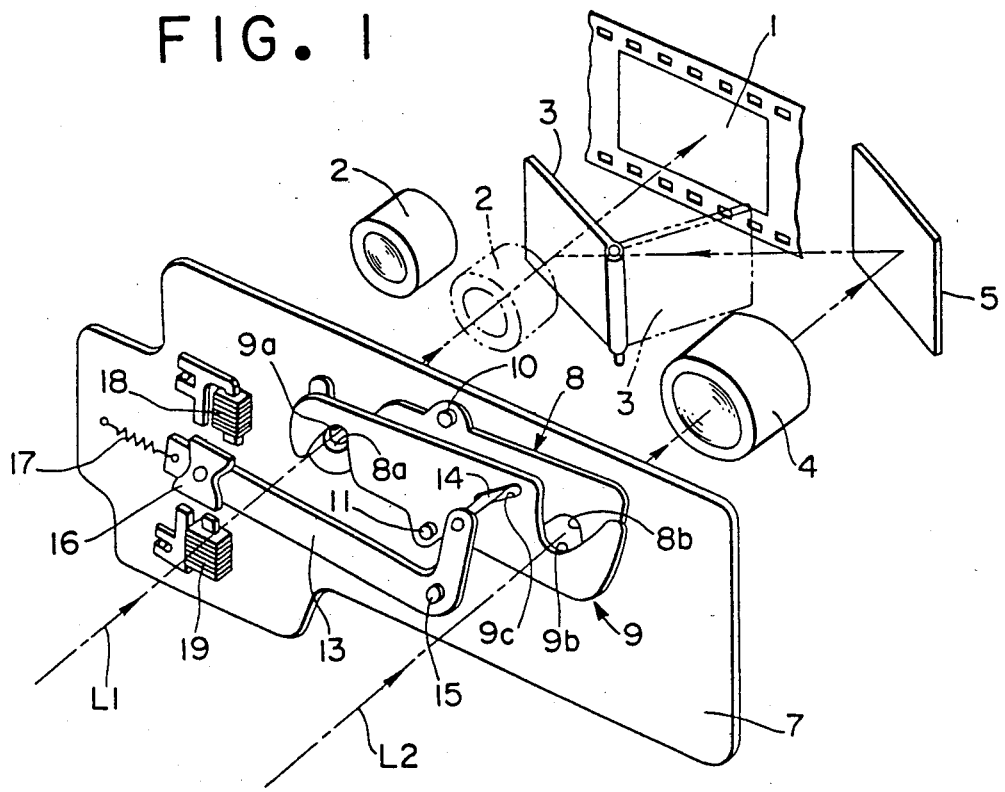
FIG. 1 is a perspective illustration showing portions of an embodiment of the exposure control device of the present invention which is utilized as a diaphragm.

Referring now to FIGS. 1 to 4, it can be seen that an exposure control device is utilized as a diaphragm arrangement and associated with a photographic camera including two objective or taking lenses, for example a wide angle and a telephoto lens, arranged side by side.

Disposed in front of a film 1, there is provided a wide angle lens 2 which is shiftable from a position shown by the solid line to another position for wide angle photography shown by the double-dotted line. A movable mirror 3 which is disposed between the wide angle lens 2 and the film 1 is pivotable in cooperation with the shift of the wide angle lens 2 from a position shown by the solid line to another one shown by the double-dotted line where it allows the light rays passed through the wide angle lens 2 to reach directly the film 1. The wide angle lens 2 may be fixedly disposed in the position shown by the double-dotted lines when the movable mirror 3 in the position shown by the solid lines does not interfere with the wide angle lens 2 in any position.

Disposed in an optical path L2, there is provided a telephoto lens 4 which is fixedly positioned. A mirror 5 which is fixedly positioned and intersects the optical path L2 at an angle reflects light rays passed through the telephoto lens 4 and then directs the reflected light rays toward the movable mirror 3. The light rays incident upon the movable mirror 3 are further reflected to travel to the film 1 along the optical path L1. The fixed and movable mirrors each reflecting the light rays passed through the telephoto lens at an angle less than a right angle are so arranged as to establish a Z-shaped optical path. The provision of the mirror 3 and 5 thus arranged can ensure a sufficiently long optical path without providing a long distance between the optical paths L1 and L2.

In the telephotography mode shown in FIG. 1, the light ray passed through the telephoto lens 4 is reflected by the fixed mirror 5 and then by the movable mirror 3, so as to strike the film 1. The operation of a changing lever (not shown) causes the wide angle lens and the movable mirror 3 simultaneously to move to the position shown by the double-dotted line, allowing the light ray passed through the wide angle lens to reach the film 1 directly. At this time, the movable mirror 3 in the dotted line position prevents the light ray reflected by the fixed mirror 5 from entering the optical path L1 and reaching the film 1.

Disposed in front of these lenses 2 and 4, there is provided a base plate 7 in which light entry openings 7a and 7b are formed. Located on the base plate 7, there are provided two diaphragm blades 8 and 9 which are pivotably mounted on shafts 10 and 11, respectively, and are in partially overlapping relation to each other. The diaphragm blades 8 and 9 include light admitting apertures as shown at 8a, 9a and 8b, 9b to cooperatively define a variety of effective aperture openings in accordance with simultaneous overlapping displacement of one diaphragm blade with respect to the other. Although the aperture openings are different in size from each other, the f numbers of the aperture openings correspond to each other.

Figure 2:
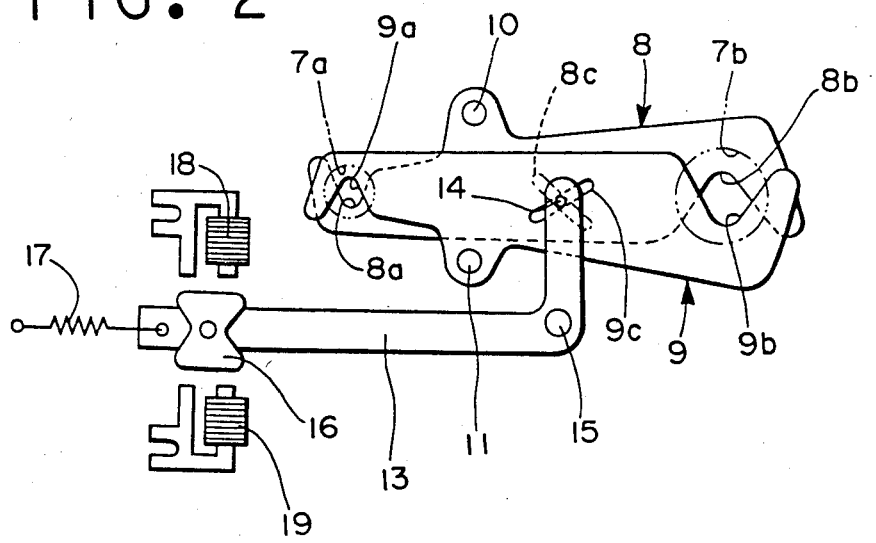
FIG. 2 is a schematic diagram showing portions of the exposure control device of FIG. 1 in a position where a light entry opening is intermediate.

The diaphragm blades 8 and 9 additionally are configurated to have slots 8c and 9c extending in different or opposite directions and overlapping each other crosswise. In order to move the diaphragm blades, there is provided an L-shaped blade moving lever 13 which is pivotably mounted on a shaft at 15 and usually maintained in a neutral position as shown in FIG. 2 under the influence of force exerted by tension spring 17. Located on the base plate 7, there are additionally provided two electromagnets 18 and 19 between which the armature 16 is positioned.

FIG. 2 shows the exposure control device in a position where the aperture openings are intermediate. In the intermediate position both of the electromagnets are deenergized to allow the blade moving lever to be maintained in a neutral position under the influence of spring force. As previously mentioned, the f numbers of the respective aperture openings which are the same are predetermined in accordance with the characteristics of lenses incorporated.

Figure 3:
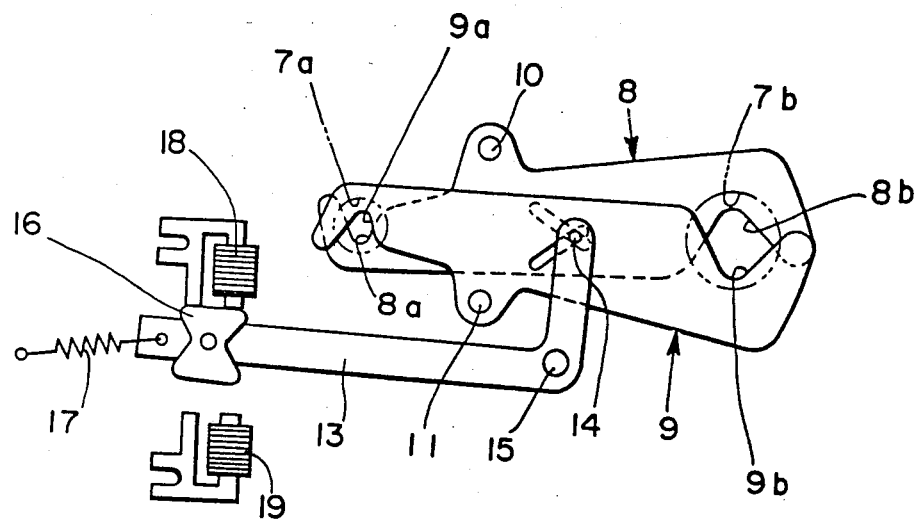
FIG. 3 is a schematic diagram similar to FIG. 2 in a different position where a light entry opening is maximum.

FIG. 3 shows the exposure control device in a position where the aperture openings are maximum. The maximum aperture openings are produced in such a way that, when the electromagnet 18 is energized to hold the armature 16, the blade moving lever 13 swings clockwise so that the diaphragm blades 8 and 9 move away from each other. As a result of this, the overlap of one blade with respect to the other blade becomes small to cooperatively define the maximum aperture openings 8a–9a and 8b–9b which are the same in F number.

Figure 4:
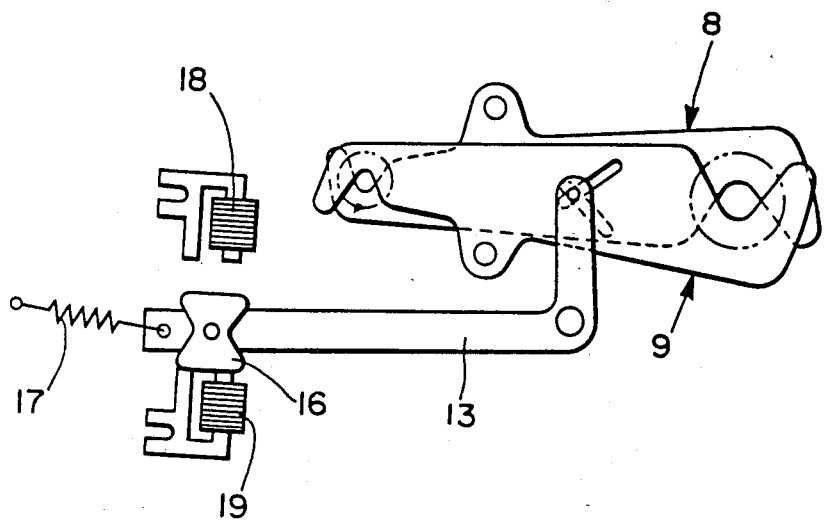
FIG. 4 is a schematic diagram similar to FIG. 1 in a further different position where a light entry opening is minimum.

FIG. 4 shows the diaphragm blades in a position where the aperture openings are minimum. The minimum aperture openings are produced when the electromagnet 19 is energized to hold the armature 16, causing the blade moving lever 13 to swing counterclockwise so that the diaphragm blades 8 and 9 move close to each other.

Figure 5:
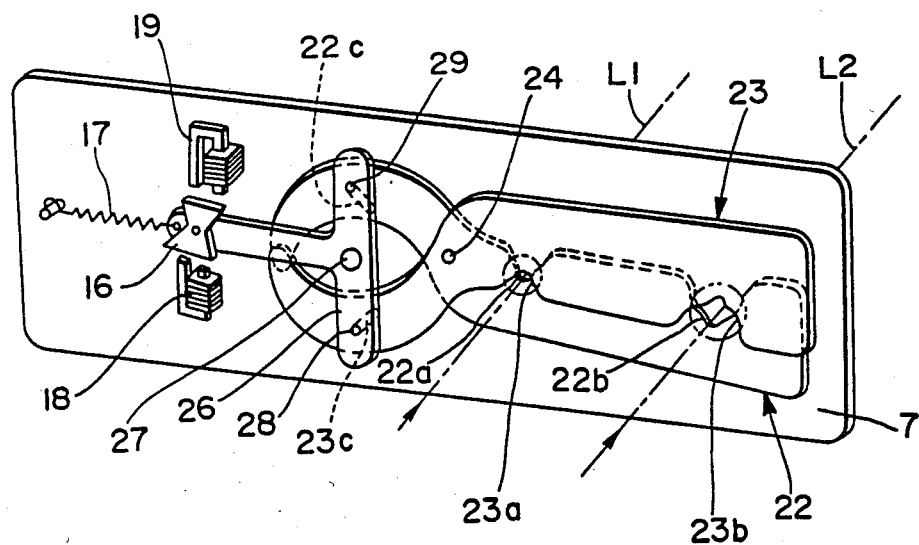
FIG. 5 is a perspective illustration showing portions of another embodiment of an exposure control device of the present invention which is utilized as a diaphragm.

FIG. 5 shows another embodiment of the exposure control device in accordance with the present invention wherein the same numerals denote parts similar to those of the first embodiment shown in FIGS. 1 to 4. In FIG. 5, located on the base plate 7, there are provided two diaphragm blades 22 and 23 which are pivotably mounted on a common shaft 24 and are in partially overlapping relation to each other. Each of the diaphragm blades 22 and 23 includes, respectively, light admitting apertures 22a and 22b, 23a and 23b different in size to cooperatively define effective aperture openings with simultaneous overlapping displacement of one diaphragm blade with respect to the other. In order to cause the pivotal movement of the diaphragm blades, there is provided a T-shaped blade moving lever 26 which has two arms each provided with a pin 28, 29 at its end portion and is pivotably mounted on a shaft 27. The diaphragm blades are further provided, respectively, with extending portions including slots 22c and 23c in which the pin members 28 and 29 are engaged, respectively.

The diaphragm blades 22 and 23 shown in Fig. 5 define intermediate aperture openings because of the fact that the electromagnets 18 and 19 are deenergized and the blade moving lever 26 is subjected to the force of the spring 17. Similarly to the first embodiment, when the electromagnet 18 is energized to hold the armature 16, the blade moving lever 26 pivots anticlockwise about the shaft 24 so as to cause the diaphragm blades to pivotably move in opposite directions, i.e., away from each other. As a result of this, the diaphragm blades 22 and 23 cooperatively define maximum aperture openings. On the other hand, upon the energization of the electromagnet 19, the diaphragm blades 22 and 23 are caused to pivotally move close to each other as a result of the clockwise pivotal movement of the blade moving lever 26. so as to cooperatively define minimum aperture openings.

Figure 6:
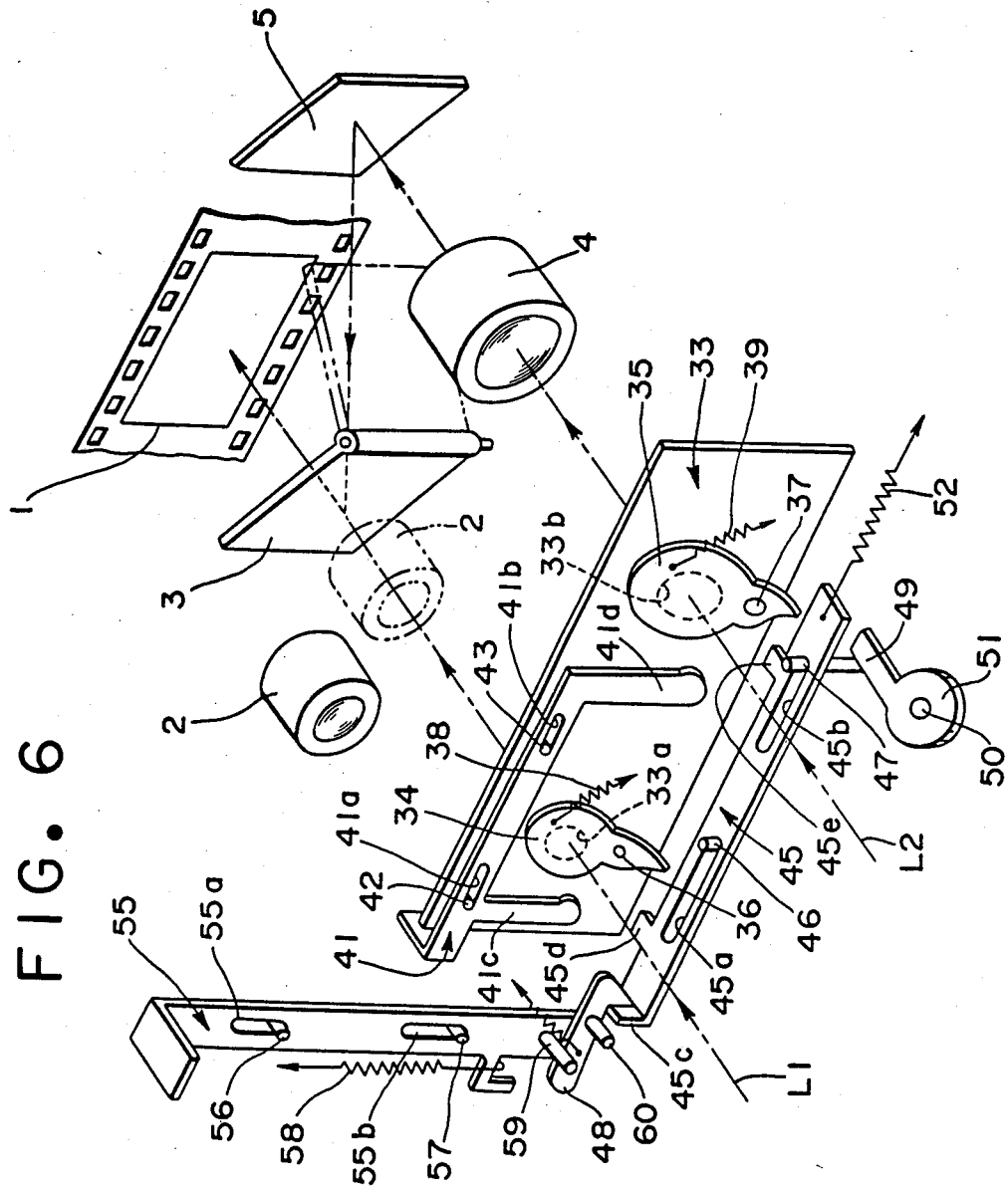
FIG. 6 is a perspective illustration showing portions of a further embodiment of the present invention which is utilized as a shutter.

Referring now to FIG. 6, there is shown still another embodiment of the exposure control device in accordance with the present invention which is utilized as a shutter arrangement and associated with a photographic camera including two objective or taking lenses, for example a wide angle and a telephoto lens, arranged side by side. Disposed in front of the objective lenses, there is provided a base plate 33 in which light entry openings 33a and 33b are formed. Located over the light entry openings, there are provided shutter blades 34 and 35 which are pivotably mounted on shaft at 36 and 37 and urged to move clockwise by springs 38 and 39, respectively.

A time control lever 41 is configured to have projection arms 41c and 41d each extending downwardly therefrom. The time control lever 41 further includes guide slots 41a and 41b through which guide pins 42 and 43 on the base plate 33 are engaged so as to allow the movement thereof back and forth on the base plate 33. Each of the arms 41c and 41d of the time control lever 41 limits the pivotal movement of the shutter blade to set the shutter to a proper speed. It is to be noted that the time control lever 41 can operate in such a way that the shutter speeds generated by the shutter blades 34 and 35 are the same.

A blade moving lever 45 which is provided for causing the pivotal movement of the shutter blades is configurated to have guide slots 45a and 45b engageable with guide pins 46 and 47, a bent portion 45c which is engaged by the hook of a retaining lever 48 and projections 45d and 45e which stroke the shutter blades to pivotally move them in the course of the slide movement thereof. On the under side of the blade moving lever 45, there is a pin member 49 which is pushed by a lever 51 pivotally movable about a shaft 50 on a winding operation of film. Upon the counterclockwise pivotal movement of the lever 51, the blade moving lever 45 is forced to move to the left against the action of a spring 52 to a positon where the bent portion 45c is engaged by the retaining lever 48. After the engagement of the bent portion by the retaining lever, the lever 51 returns to its initial position as is well known to those in the art.

A release lever 55 is so provided as to move up and down through pin-slot engagements 55a-56 and 55b-57. Disposed at the lever end of the release lever 55, there is provided a pin member 59 which pushes the retaining lever 48 so as to cause an anticlockwise movement of the retaining lever 48. The release lever 55 causes the release of the engagement of the retaining lever 48 with the blade moving lever 45 upon moving down against the force of a spring 58. The blade moving lever 45 thus released moves to the right under the influence of the spring force to strike the tail ends of the shutter blades 34 and 35 by the projection 45d and 45e extending therefrom, respectively. As a result of these, this shutter blades 34 and 35 pivot counterclockwise about the respective shafts 36 and 37 to a position where the shutter blades strike the projection arms 41c and 41d to open the light entry openings 33a and 33b. Immediately after the stoke, the shutter blades are forced to return to their initial positions under the influence of the springs 38 and 39 which are stressed by the counterclockwise movements of the shutter blades 34 and 35, so as to close the light entry openings 33a and 35b. In the shutter arrangement, shutter speed is adjusted corresponding to the position of the time control lever 41, that is, the shutter speed becomes fast as the time control lever 41 is moved to right. It should be also noted in this embodiment that the exposure control device may be so arranged as to serve as a diaphragm as well as a shutter. In this case, the blades 34 and 35 are operated to give the same shutter speed and f number.

Figure 7:
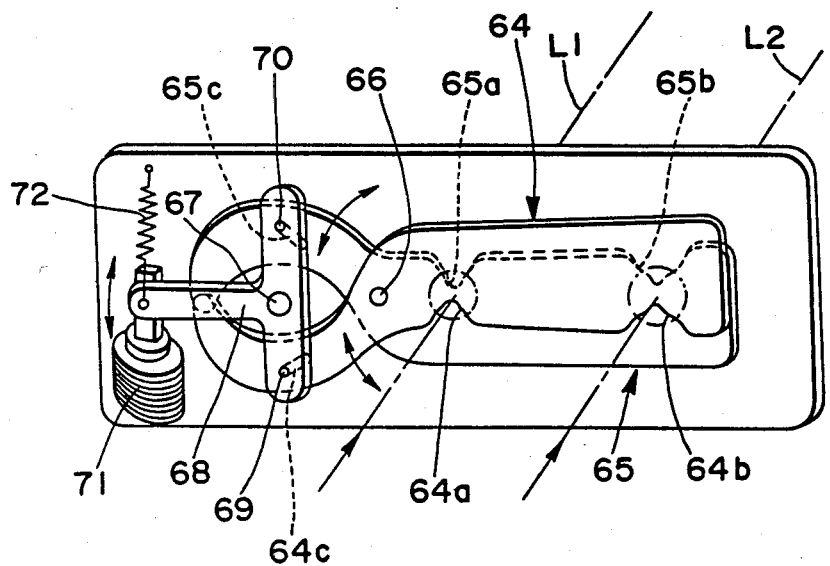
FIG. 7 is a perspective illustration showing portions of still further embodiment of the present invention which is utilized as a shutter.

FIG. 7 shows another embodiment of the exposure control device utilized as a shutter arrangement. Located on the base plate, there are provided two shutter blades 64 and 65 which are partially overlapped and pivotably mounted on a shaft 66. The shutter blades are, respectively, configurated to have two light admitting apertures 64a, 64b and 65a, 65b different in size. The shutter blades 64 and 65 are usually so positioned as to space the corresponding apertures from each other and thus intercept the light along the optical paths L1 and L2. When the shutter blades 64 and 65 simultaneously in opposite directions, the corresponding apertures are brought into an overlapping relation to each other so as to produce aperture openings which admit the light along the optical paths L1 and L2 to pass therethrough.

In order to effect the pivotal movement of the shutter blades, there is provided a T-shaped blade moving lever 68 which is pivotably mounted on a shaft 67 and includes pin members 69 and 70 engaged with slots 64c and 65c formed in the shutter blades 64 and 65, respectively. The blade moving lever 68 is caused to pivot counterclockwise about the shaft 66 upon the energization of a solenoid 71, causing the shutter blades 64 and 65 to pivot simultaneously in opposite directions. As a result of the pivotal movement of the shutter blades, the corresponding apertures 64a, 65a and 64b, 65b are brought into an overlapping relation to each other so as to admit the light along the optical paths L1 and L2 to pass threthrough. Upon the deenergization of the solenoid 71 after a predetermined period, the blade moving lever 68 is caused to return to its initial position shown in FIG. 7, and then the shutter blades 64 and 65 are also returned to their initial positions so as to intercept the light along the optical pathes L1 and L2. The return movement of the blade moving lever 68 is effected by a spring 72.

Although the exposure control device shown in FIG. 7 effects a single exposure control, it may be modified to effect exposure control in several steps in a way well known to those in the art. For example, it can be accomplished by providing the blade moving lever 68 with a pin member and a step cam against which the pin member abuts. The step cam is displaced by one or two solenoids to change the position where the abutment against the pin occurs. A shutter operating lever which is previously brought into an operable position in cooperation with film winding operation is released by the manipulation of a shutter actuation member to move. In the course of the movement, the shutter operating lever hits and causes the blade moving lever 68 and hence, the shutter blades 64 and 65 to pivot. The pivotal movements of the blades are continued until the blade moving lever 68 comes into abutment against the step cam. Furthermore, the exposure control device may be modified to operate as a program shutter effecting exposure control in four steps. The modification is accomplished by the provision of another solenoid in addition to the solenoids and a stop lever which is moved by the another solenoid so as to stop the blade moving lever 68 before the abutment of the pin member against the step cam.

In the case of a wide angle and a telephoto lens of the type having a front diaphragm arrangement effective apertures of the respective lenses of the same f number are in proportion to the respective focal lengths. For example, assuming that a wide angle lens has a focal length of 30 mm and a telephoto lens has a focal length of 90 mm, and each of these lenses has an aperture of F 8 the effective aperture of the wide angle lens is 4 mm in diameter and that of the telephoto lens is 12 mm in diameter. Assuming that each of these lens has an aperture of F 16, the effective apertures are 2 mm and 6 mm in diameter for the wide angle and the telephoto lens, respectively. Consequently, in order to set simultaneously the effective apertures of a wide angle and a telephoto lens by using one drive means, the ratio of distance between the supporting point of two diaphragm blades and the optical axes of the lenses is determined corresponding to the ratio of the focal lengths thereof.

The long focus lens (telephoto lens) and the short focus lens (wide angle lens) in the above description are generally referred to two lenses, whereas the combination of a telephoto lens and a standard lens or a standard lens and a wise angle lens may be applicable following the same results.

It will be appreciated that modification and revision may be made to the embodiment described above without departing from what is regarded to be the present invention.

What is claimed is:

1. In a camera having a first objective lens of a relatively long focal length, a second objective lens of a relatively short focal length, said first and second objective lenses being arranged side by side and having parallel optical axes, and means selectively to establish an optical path to a film through either of said first and second lenses; the improvement comprising: a shutter apparatus comprising a mounting plate having openings, said plate being disposed so that said openings are in alignment with the optical axes of said first and second lenses, respectively, a first shutter pivotally mounted on said plate, means displacing said first shutter between two positions wherein said first shutter respectively opens and closes a light path of the first lens; a second shutter pivotally mounted on said plate, means displacing said second shutter between two positions wherein said second shutter respectively opens and closes a light path of the second lens; and means simultaneously displacing said first and second shutters from said closed positions to said open positions, said simultaneous displacing means comprising a driving lever slidably movable in a direction perpendicular to the optical axes of said first and second objective lenses, said driving lever having projection arms which are adapted to abut said first and second shutters, respectively, and a spring urging said projection arms against said first and second shutters.

2. An apparatus as defined in claim 1, wherein said first and second shutters are arranged side by side.

3. An apparatus as defined in claim 2, and means disposed on said mounting plate limiting the movement of said first and second shutters so as to set them to proper speeds.

4. An apparatus as defined in claim 1, and a spring individual to each said first and second shutter for urging its associated shutter toward said closed position.

5. An apparatus as defined in claim 1, wherein said simultaneous displacing means comprises a retaining lever engaging said driving lever at a position in which said driving lever spring is biased, and a release lever actuating said retaining lever so as to disengage said retaining lever from said driving lever.

6. An apparatus as defined in claim 4, wherein said limiting means has a first and a second projection, each of which is adapted to intercept said first and second shutters respectively, said first and second projections being displaceable within the range of movement of the said first and second shutters for time control.

* * * * *